United States Patent
Wu et al.

(10) Patent No.: US 8,735,534 B2
(45) Date of Patent: May 27, 2014

(54) PRECURSOR COMPOSITION FOR POLYIMIDE AND USE THEREOF

(75) Inventors: Chung-Jen Wu, Kaohsiung (TW); Pi-Jen Cheng, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 555 days.

(21) Appl. No.: 12/572,398

(22) Filed: Oct. 2, 2009

(65) Prior Publication Data

US 2010/0168265 A1   Jul. 1, 2010

(30) Foreign Application Priority Data

Dec. 31, 2008  (TW) .............................. 97151913 A

(51) Int. Cl.
C08G 73/10 (2006.01)
C08G 73/12 (2006.01)
C08L 79/08 (2006.01)

(52) U.S. Cl.
USPC ............. 528/353; 528/26; 528/423; 528/322; 522/33

(58) Field of Classification Search
USPC ........................................... 528/353
See application file for complete search history.

(56) References Cited

U.S. PATENT DOCUMENTS 5,382,637 A   1/1995   Angelopoulos

FOREIGN PATENT DOCUMENTS

TW   2008-21339       5/2008
TW   200821339 A  *  5/2008

OTHER PUBLICATIONS

Greene et al (Protective Groups in Organic Synthesis [e-book]. Wiley; 1999. Available from: eBook Collection (EBSCOhost), pp. 424-425, 503-525).*

Korean Office Action dated May 19, 2011. Application No. 10-2009-0117386.

* cited by examiner

Primary Examiner — Randy Gulakowski
Assistant Examiner — Rachel Kahn
(74) Attorney, Agent, or Firm — Shimokaji & Associates P.C.

(57) ABSTRACT

The present invention provides a precursor composition for polyimides, said composition comprising an amic acid oligomer of formula (1) and a dianhydride derivative with ester (—C(O)OR) and carboxy (—C(O)OH) terminal groups of formula (2):

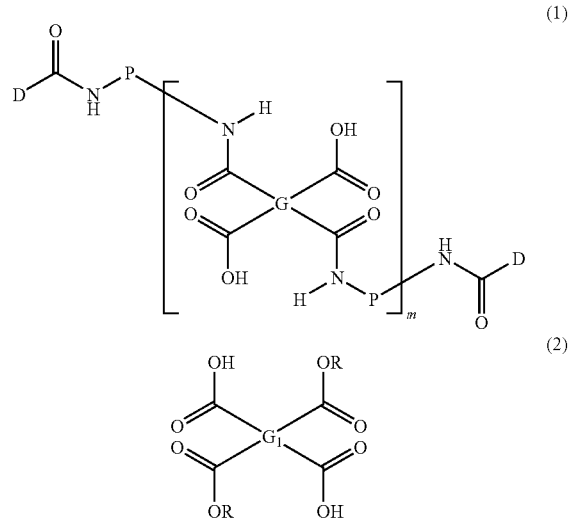

wherein R, G, $G_1$, P, D and m are as defined in the specification. The invention also provides polyimides synthesized from the above-mentioned precursor composition.

13 Claims, No Drawings

PRECURSOR COMPOSITION FOR POLYIMIDE AND USE THEREOF

BACKGROUND OF THE INVENTION

1. Field of the Invention

The present invention relates to a precursor composition for a polyimide (PI). The present invention also relates to the use of the precursor composition in the preparation of polyimides.

2. Description of the Prior Art

Due to their superior thermal stability and excellent mechanical, electrical, and chemical properties, polyimides have become the top choice among high performance polymeric materials. Rising semiconductor standards have highlighted the limitations of conventional inorganic materials and accentuated the ability of polyimides to resolve aspects of these shortcomings. Since their introduction by the E.I. Du Pont Company, polyimides have become widely used in a variety of applications.

In the semiconductor industry, polyimides have been extensively used in passivation coatings, stress buffer coatings, α-particle barriers, dry-etch masks, microelectromechanical and interlayered insulation films. Still more uses are being developed. Polyimides are primarily used as a protective coating for integrated circuit elements because the polyimide materials can pass reliability testing of integrated circuit elements. Outside of the integrated circuit industry, polyimides are also used in electronic packaging, enamelled wires, printed circuit boards, sensing elements, separating films, and structural materials.

Polyimides are typically synthesized in a two-stage polymerization and condensation reaction. In the first stage, a diamine monomer is normally dissolved in a polar aprotic solvent, such as N-methylpyrrolidone (NMP), N,N-dimethylacetamide (DMAC), dimethylformamide (DMF), or dimethyl sulfoxide (DMSO). A molar equivalent of a dianhydride monomer is then added. Afterwards, the condensation reaction is conducted at low or room temperature to form a precursor for the polyimide, i.e., poly(amic acid) (PAA).

In the second stage, thermal or chemical imidization is carried out to achieve a condensation, dehydration, and cyclization reaction so as to convert the poly(amic acid) into a polyimide.

Under current practice, the reaction scheme for preparing polyimides can be summarized by the following diagram:

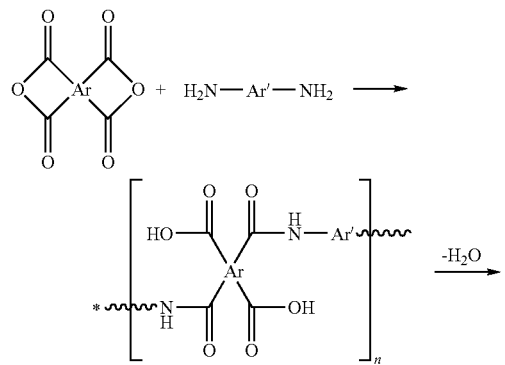

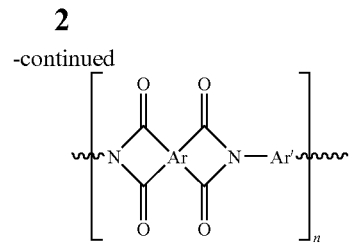

In the above preparation method, if the molecular weight of the poly(amic acid) obtained in the first stage does not reach a certain standard (i.e., it is overly low), a polyimide film having good physical properties cannot be obtained after imidization. However, if the molecular weight of the poly(amic acid) obtained in the first stage is overly high, the PAA will be too viscous to be operable. In addition, poor leveling easily occurs in the coating step. For example, spin coating may produce a convex middle and thick edges. Moreover, if the poly(amic acid) is overly high in molecular weight, an extremely strong internal stress is produced due to the interaction between molecules and the shortening of molecular chains in the imidization of the second stage. The strong internal stress causes the coated substrate to bend and deform. To address these problems, various studies have explored the relationship between the gradient heating curve control during the imidization of the second stage and the internal stress. Various approaches to decreasing the internal stress have been developed as well. Regardless of approach, the primary cause of the problems of leveling and internal stress is overly high molecular weight of the poly(amic acid) obtained in the first stage. In other words, if the molecular weight of the poly(amic acid) can be adequately controlled, a polyimide film with excellent physical properties can be achieved.

TW Patent Application No. 095141664 discloses a precursor composition for polyimides comprising an amic acid oligomer having two terminal amino groups and a dianhydride derivative with both ester (—C(O)OR) and carboxy (—C(O)OH) terminal groups which can maintain a meta-stable status with the amic acid oligomer and thus will not react with the two terminal amino groups of the amic acid oligomer at room temperature. In addition, since the amic acid oligomer has a lower molecular weight, the precursor composition has excellent operability and the resultant polyimides exhibit excellent thermal, mechanical, and stretching properties. However, this precursor composition can only be subjected to thermal imidization. In thermal imidization, 100% imidization generally requires heating at 250° C. to 350° C. for several hours, a process which is lengthy and liable to cause industrial safety problems. Moreover, in products with side chains of a low bonding energy, high temperature will cause the side chains to break before cyclization.

The present invention discloses a special synthesis method of subjecting a specific polymide precursor composition to low temperature dehydration and cyclization, with consideration of operability, to obtain polyimides having desirable physical properties meeting the demands of industry.

SUMMARY OF THE INVENTION

One of the objects of the present invention is to provide a precursor composition for polyimides, said composition comprising an amic acid oligomer and a dianhydride derivative with ester (—C(O)OR) and carboxy (—C(O)OH) terminal groups.

Another object of the present invention is to provide a polyimide obtained from the above-mentioned precursor composition for polyimides.

DETAILED DESCRIPTION OF THE INVENTION

The precursor composition for polyimides according to the present invention comprises:
(a) an amic acid oligomer of the following formula (1):

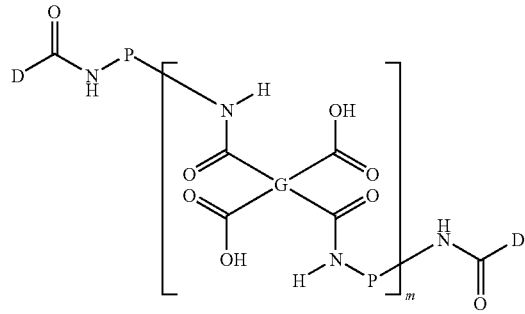

and
(b) a compound of the following formula (2)

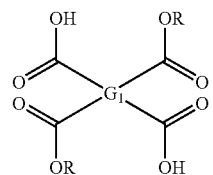

wherein:
R represents a linear or branched alkyl with 1 to 14 carbon atoms, a phenol group, or an ethylenically unsaturated group;
G and $G_1$ can be the same or different and each independently represents a tetravalent organic group;
P represents a divalent organic group;
D each independently represents a nitrogen-containing heterocyclic or an OR*-containing group wherein R* is a linear or branched alkyl with 1 to 20 carbon atoms; and
m is an integer from 1 to 100, preferably from 5 to 50.

The above-mentioned components (a) and (b) are present in a molar ratio ranging from 0.8:1 to 1.2:1, preferably from 0.9:1 to 1.1:1.

According to an embodiment of the present invention, in the above formula (2), R represents a linear or branched alkyl with 1 to 14 carbon atoms and is selected from:

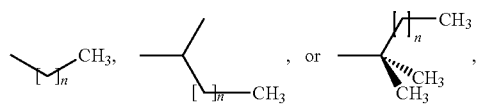

wherein, n is an integer from 0 to 10. Examples of the linear or branched alkyl with 1 to 14 carbon atoms include, but are not limited to, methyl, ethyl, n-propyl, isopropyl, 1-methylpropyl, 2-methylpropyl, n-butyl, isobutyl, tert-butyl, 1-methylbutyl, 2-methylbutyl, amyl, hexyl, heptyl, and octyl.

R can also be a phenol group, such as a group of

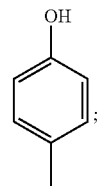

or an ethylenically unsaturated group selected from the group consisting of vinyl, propenyl, methylpropenyl, n-butenyl, isobutenyl, vinylphenyl, propenylphenyl, propenyloxymethyl, propenyloxyethyl, propenyloxypropyl, propenyloxybutyl, propenyloxyamyl, propenyloxyhexyl, methylpropenyloxymethyl, methylpropenyloxyethyl, methylpropenyloxypropyl, methylpropenyloxybutyl, methylpropenyloxyamyl, and methylpropenyloxyhexyl, and a group of any of the following formulae (7) and (3):

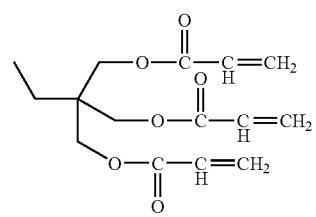

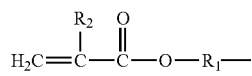

wherein, R1 is phenylene, a linear or branched $C_1$-$C_8$ alkylene, a linear or branched $C_2$-$C_8$ alkenylene, a $C_3$-$C_8$ cycloalkylene, or a linear or branched $C_1$-$C_8$ hydroxyalkylene, and $R_2$ is H or a $C_1$-$C_4$ alkyl.

Preferably, the R group in formula (2) each independently represents:

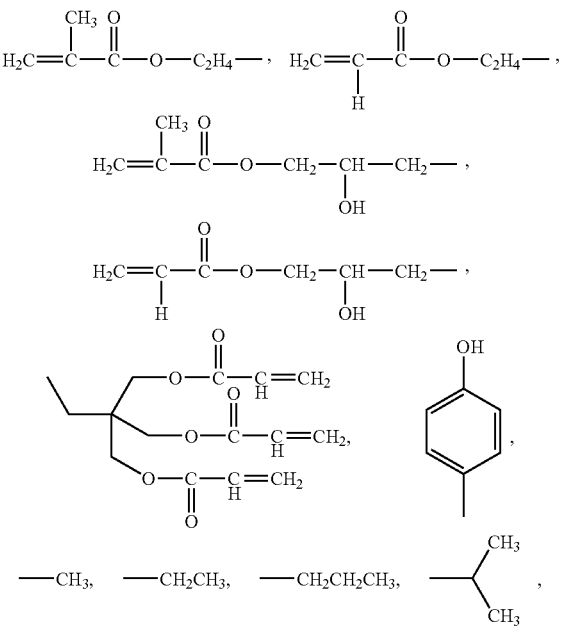

-continued

[chemical structures]

According to the present invention, G and G₁ can be the same or different tetravalent organic groups. Preferably, G and G₁ each independently represent

[chemical structures]

wherein each Y independently represents H, a halo group, $C_1$-$C_4$ alkyl, or $C_1$-$C_4$ perfluoroalkyl, and B represents —CH₂—, —O—, —S—, —CO—, —SO₂—, —C(CH₃)₂—, or —C(CF₃)₂—. More preferably, G and G₁ each independently represent:

[chemical structures]

-continued

[chemical structure with CF₃ groups]

In one embodiment according to the present invention, both G and G₁ are

[chemical structure]

The divalent organic group P of the amic acid oligomer of formula (1) of the present invention is not particularly limited. Typically, the divalent organic group P is an aromatic group, and preferably, independently represents:

[chemical structures]

wherein each X independently represents H, a halo group, $C_1$-$C_4$ alkyl, or $C_1$-$C_4$ perfluoroalkyl; A represents —O—, —S—, —CO—, —CH₂—, —OC(O)—, or —CONH—. More preferably, each divalent organic group P independently represents:

[chemical structures]

or

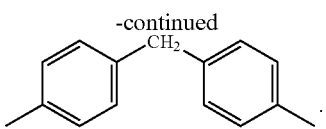

In one embodiment, the divalent organic group P is

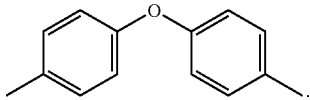

The divalent organic group P can also be a non-aromatic group, such as:

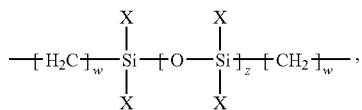

wherein X has the meaning as defined hereinbefore, and w and z each independently represent an integer from 1 to 3.

Preferably, the divalent organic group P is

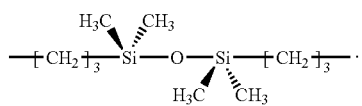

In the amic acid oligomer of formula (1) of the present invention, group D each independently represents a nitrogen-containing heterocyclic group or an OR*-containing group wherein R* is a linear or branched alkyl with 1 to 20 carbon atoms. Preferably, D each independently represents

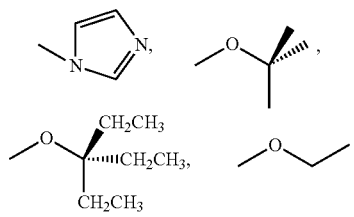

Optionally, the composition of the present invention further comprises a polar aprotic solvent. Preferably, the polar aprotic solvent is selected from the group consisting of N-methylpyrrolidone (NMP), N,N-dimethylacetamide (DMAC), N,N-dimethylformamide (DMF), dimethyl sulfoxide (DMSO), and a mixture thereof.

The composition of the present invention can optionally contain an additive known to persons having ordinary skill in the art as being suitable for the preparation of polyimides, including but not being limited to a leveling agent, a defoaming agent, a coupling agent, a dehydrating agent, a catalyst, or a photoinitiator.

The photoinitiator suitable for the present invention can be selected from, but is not limited to, the group consisting of benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, 2,4,6-trimethylbenzoyl diphenyl phosphine oxide, and a mixture thereof.

The coupling agent suitable for the present invention can be selected from the group consisting of 3-aminopropyltrimethoxysilane (APrTMOS), 3-triaminopropyltriethoxysilane (APrTEOS), 3-aminophenyltrimethoxysilane (APTMOS), 3-aminophenyltriethoxysilane (APTEOS), and a mixture thereof.

The precursor composition of the present invention can be prepared by any method well known to persons having ordinary skill in the art. For example, the amic acid oligomer in the precursor composition of the present invention can be produced by the following process.

First, a diamine of formula $H_2N$—P—$NH_2$ is mixed and reacted with a dianhydride of the following formula (4) to obtain an amic acid oligomer with terminal amino groups of formula (8):

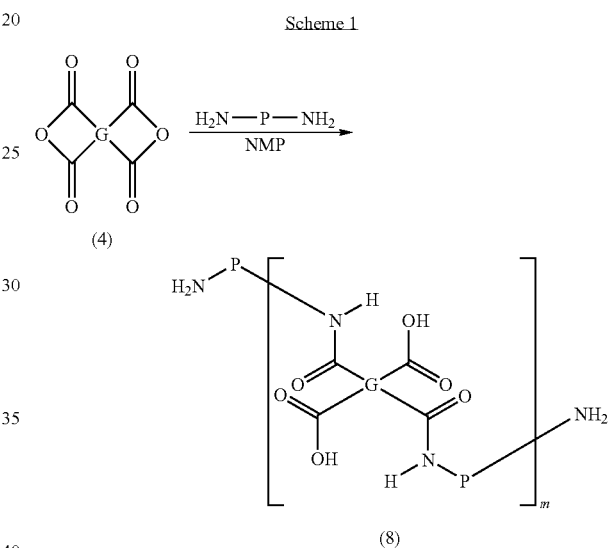

wherein G and P are as defined hereinbefore. Preferably, according to the molecular weight of the amic acid oligomer to be obtained (i.e., the value of m), a necessary amount of the diamine is calculated and dissolved in a polar aprotic solvent to form a solution. Thereafter, a suitable amount of the dianhydride is added to the solution to undergo a reaction so as to obtain the amic acid oligomer of formula (8).

For example, a diamine can be dissolved in a polar aprotic solvent selected from the group consisting of N-methylpyrrolidone (NMP), N,N-dimethylacetamide (DMAC), N,N-dimethylformamide (DMF), dimethyl sulfoxide (DMSO), and a mixture thereof. The reaction between the diamine and dianhydride is normally conducted at 0° C. to 100° C., preferably at 0° C. to 50° C., for 5 to 12 hours.

In the above process for preparing the amic acid oligomer of formula (8), the dianhydride of formula (4) is preferably an aromatic dianhydride. The examples of an aromatic dianhydride include, but are not limited to, pyromellitic dianhydride (PMDA), 4,4'-biphthalic dianhydride (BPDA), 4,4'-hexafluoroisopropylidenediphthalic dianhydride (6FDA), 1-(trifluoromethyl)-2,3,5,6-benzenetetracarboxylic dianhydride (P3FDA), 1,4-bis(trifluoromethyl)-2,3,5,6-benzenetetracarboxylic dianhydride (P6FDA), 1-(3',4'-dicarboxyphenyl)-1,3,3-trimethylindan-5,6-dicarboxylic dianhydride, 1-(3',4'-dicarboxyphenyl)-1,3,3-trimethylindan-6,7-dicarboxylic dianhydride, 1-(3',4'-dicarboxyphenyl)-3-methylindan-5,6- dicarboxylic dianhydride, 1-(3',4'-dicarboxyphenyl)-3-methylindan-6,7-dicarboxylic dianhydride, 2,3,9,10-perylenetetracarboxylic dianhydride, 1,4,5,8-naphthalenetetracarboxylic dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-2,4,5,8-tetracarboxylic dianhydride, phenanthrene-1,8,9,10-tetracarboxylic dianhydride, 3,3',4,4'-benzophenonetetracarboxylic dianhydride, 1,2',3,3'-benzophenonetetracarboxylic dianhydride, 3,3',4,4'-biphenyltetracarboxylic dianhydride, 3,3',4,4'-benzophenonetetracarboxylic dianhydride, 2,2',3,3'-biphenyltetracarboxylic dianhydride, 4,4'-isopropylidenediphthalic anhydride, 3,3'-isopropylidenediphthalic anhydride, 4,4'-oxydiphthalic anhydride, 4,4'-sulfonyldiphthalic anhydride, 3,3'-oxydiphthalic anhydride, 4,4'-methylenediphthalic anhydride, 4,4'-thiodiphthalic anhydride, 4,4'-ethylidenediphthalic anhydride, 2,3,6,7-naphthalenetetracarboxylic dianhydride, 1,2,4,5-naphthalenetetracarboxylic dianhydride, 1,2,5,6-naphthalenetetracarboxylic dianhydride, benzene-1,2,3,4-tetracarboxylic dianhydride, pyridine-2,3,5,6-tetracarboxylic dianhydride, and a mixture thereof.

Preferably, the aromatic dianhydride is selected from the group consisting of pyromellitic dianhydride (PMDA), 4,4'-biphthalic anhydride (BPDA), 4,4'-hexafluoroisopropylidenediphthalic dianhydride (6FDA), 1-(trifluoromethyl)-2,3,5,6-benzenetetracarboxylic dianhydride (P3FDA), 1,4-bis(trifluoromethyl)-2,3,5,6-benzenetetracarboxylic dianhydride (P6FDA), and a mixture thereof. In one embodiment, pyromellitic dianhydride (PMDA) is used.

The diamine of formula $H_2N—P—NH_2$ (where P is as defined hereinbefore) used in the process shown in Scheme 1 can be an aromatic diamine well known to persons having ordinary skill in the art. For example, the aromatic diamine can be selected from, but is not limited to, the following group: 4,4'-oxy-dianiline (ODA), para-phenylenediamine (pPDA), 2,2-dimethyl-4,4-diamino-biphenyl (DMDB), 2,2'-bis(trifluoromethyl)benzidine (TFMB), o-tolidine (oTLD), 4,4'-octafluorobenzidine (OFB), tetrafluorophenylenediamine (TFPD), 2,2',5,5'-tetrachlorobenzidine (TCB), 3,3'-dichlorobenzidine (DCB), 2,2'-bis(3-aminophenyl)hexafluoropropane, 2,2'-bis(4-aminophenyl)hexafluoropropane, 4,4'-oxo-bis(3-trifluoromethyl)aniline, 3,5-diaminobenzotrifluoride, tetrafluorophenylene diamine, tetrafluoro-m-phenylene diamine, 1,4-bis(4-aminophenoxy-2-tert-butylbenzene (BATB), 2,2'-dimethyl-4,4'-bis(4-aminophenoxy)biphenyl (DBAPB), 2,2-bis[4-(4-aminophenoxy)phenyl]hexafluoropropane (BAPPH), 2,2'-bis[4-(4-aminophenoxy)phenyl]norborane (BAPN), 5-amino-1-(4'-aminophenyl)-1,3,3-trimethylindane, 6-amino-1-(4'-aminophenyl)-1,3,3-trimethylindane, 4,4'-methylenebis(o-chloroaniline), 3,3'-dichlorobenzidine (DCB), 3,3'-sulfonyldianiline, 4,4'-diaminobenzophenone, 1,5-diaminonaphthalene, bis(4-aminophenyl)diethyl silane, bis(4-aminophenyl)diphenyl silane, bis(4-aminophenyl)ethyl phosphine oxide, N-(bis(4-aminophenyl)-N-methyl amine, N-(bis(4-aminophenyl))-N-phenyl amine, 4,4'-methylenebis(2-methylaniline), 4,4'-methylenebis(2-methoxyaniline), 5,5'-methylenebis(2-aminophenol), 4,4'-methylenebis(2-methylaniline), 4,4'-oxybis(2-methoxyaniline), 4,4'-oxybis(2-chloroaniline), 2,2'-bis(4-aminophenol), 5,5'-oxybis(2-aminophenol), 4,4'-thiobis(2-methylaniline), 4,4'-thiobis(2-methoxyaniline), 4,4'-thiobis(2-chloroaniline), 4,4'-sulfonylbis(2-methylaniline), 4,4'-sulfonylbis(2-ethoxyaniline), 4,4'-sulfonylbis(2-chloroaniline), 5,5'-sulfonylbis(2-aminophenol), 3,3'-dimethyl-4,4'-diaminobenzophenone, 3,3'-dimethoxy-4,4'-diaminobenzophenone, 3,3'-dichloro-4,4'-diaminobenzophenone, 4,4'-diaminobiphenyl, m-phenylenediamine, 4,4'-methylenedianiline (MDA), 4,4'-thiodianiline, 4,4'-sulfonyldianiline, 4,4'-isopropylidenedianiline, 3,3'-dimethoxybenzidine, 3,3'-dicarboxybenzidine, 2,4-tolyl-diamine, 2,5-tolyl-diamine, 2,6-tolyl-diamine, m-xylyldiamine, 2,4-diamino-5-chloro-toluene, 2,4-diamino-6-chloro-toluene, and a mixture thereof. Preferably, the diamine is 4,4'-oxydianiline (ODA), para-phenylenediamine (pPDA), 2,2-dimethyl-4,4-diamino-biphenyl (DMDB), 2,2'-bis(trifluoromethyl)benzidine (TFMB), o-tolidine (oTLD), 4,4'-methylenedianiline (MDA), or a mixture thereof. In one embodiment, 4,4'-oxy-dianiline (ODA) is used.

The terminal groups of the amic acid oligomer of formula (8) are amino groups whose nitrogen atoms have lone pair electrons and are liable to acting as nucleophiles. In the case of direct chemical imidization, the amic acid oligomer of formula (8) will react with the carbon atoms with partially positive charge, and thus will react with a dehydrating agent (such as acetic anhydride) to result in an amidation reaction. Under such circumstances, the amic acid oligomer cannot keep undergoing polymerization to form a polyimide having a high molecular weight. To solve this technical problem, the inventors of the present invention used a protecting group to temporarily protect the amino groups of the amic acid oligomer of formula (8). This is, a protecting agent, such as a nitrogen-containing heterocyclic compound or an OR* group containing compound (where R* is a linear or branched alkyl with 1 to 20 carbon atoms), was used to react with the amino groups of the amic acid oligomer of formula (8) so as to protect the amino groups from being reacted with a dehydrating agent. The protecting agents suitable for the present invention are obvious to persons having ordinary skill in the art, which include, for example, but are not limited to N,N'-carbonyldiimidazole (CDI), diethyl pyrocarbonate (DEPC), and di-tert-butyl dicarbonate ($Boc_2O$). The composition of the present invention is suitable for chemical imidization. As compared to thermal imidization, the process of chemical imidization is faster and provides excellent film-forming properties. Moreover, the process uses an amic acid oligomer with a lower viscosity as a precursor, which exhibits a better leveling property and operability when being coated.

The above-mentioned protecting group is not particularly limited and can be any group that can be easily removed. According to an embodiment, the present invention uses a nitrogen-containing heterocyclic group or an OR*-containing group (where R* is a linear or branched alkyl with 1 to 20 carbon atoms) as a protecting group. Preferably, the protecting group is selected from:

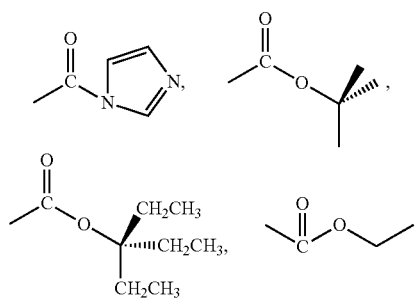

As shown in following Scheme 2, the compound of formula (1) of the composition according to the present invention can be obtained by reacting a compound of formula (8) with the protecting agent of formula (9):

In the case that di-tert-butyl dicarbonate is used as the protecting agent, the reaction scheme is as follows:

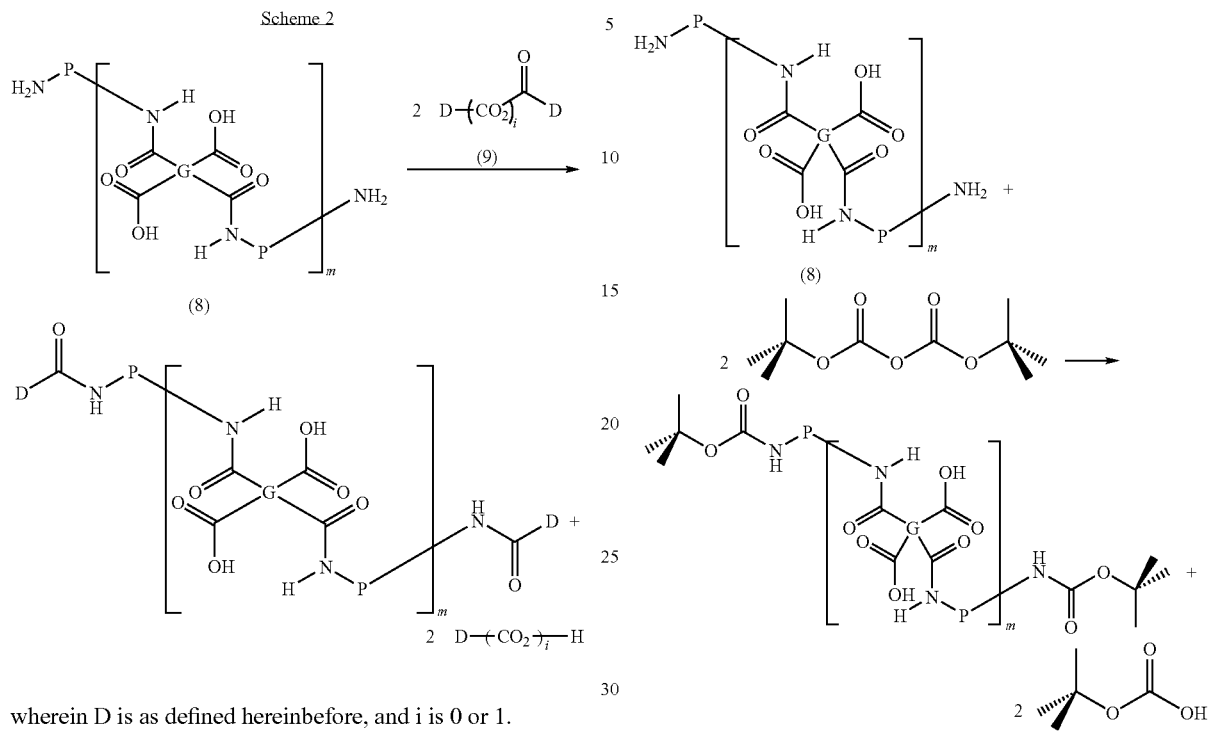

wherein D is as defined hereinbefore, and i is 0 or 1.

In the case that N,N'-carbonyldiimidazole is used as the protecting agent of formula (9), as shown in the following scheme, it will react with the two terminal amino groups of formula (8), thereby protecting the amino groups:

As shown in following Scheme 3, the compound of formula (2) of the composition of the present invention can be

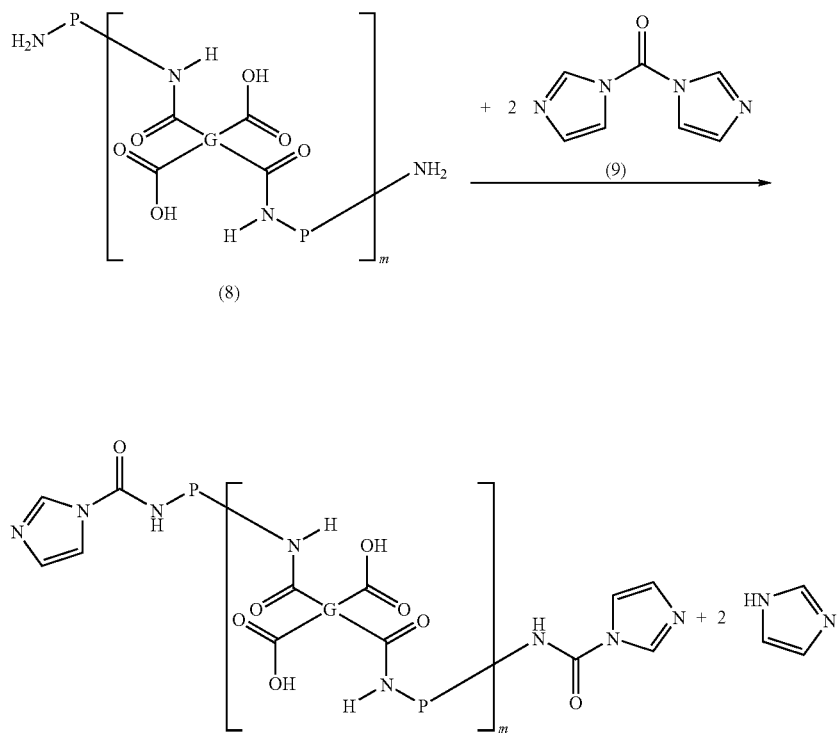

obtained by reacting a dianhydride of formula (5) with a hydroxyl-containing compound:

Scheme 3

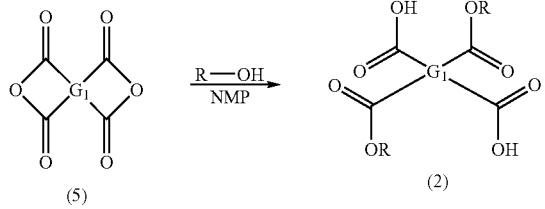

wherein $G_1$ and R are as defined hereinbefore. Preferably, the dianhydride is first dissolved in an aprotic solvent, and the hydroxyl-containing compound is then added to the solution to form the compound of formula (2) that has an ester (—C(O)OR) and carboxy (—C(O)OH) terminal groups.

For example, a dianhydride can be first dissolved in a polar aprotic solvent selected from the group consisting of N-methylpyrrolidone (NMP), N,N-dimethylacetamide (DMAC), N,N-dimethylformamide (DMF), dimethyl sulfoxide (DMSO), and a mixture thereof. In the reaction, the molar ratio of the dianhydride to the hydroxyl-containing compound used is from 1:1.8 to 1:2.5, preferably from 1:1.9 to 1:2.1. The reaction is normally conducted at 50° C. to 90° C., preferably at 50° C. to 60° C., for 1 to 3 hours.

The hydroxyl-containing compound used in the present invention can be an alcohol, such as a mono-ol, a diol, or a polyol, preferably a mono-ol. The mono-ol useful in the present invention can be a linear or branched alkanol with 1 to 14 carbon atoms, such as a linear or branched alkanol of one of the following structures:

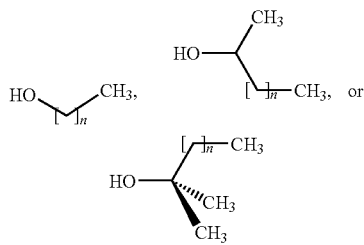

wherein n is an integer from 1 to 10. In this case, examples of the linear or branched alkanol with 1 to 14 carbon atoms include, but are not limited to, methanol, ethanol, n-propanol, isopropanol, 1-methylpropanol, n-butanol, isobutanol, neobutanol, 1-methylbutanol, 2-methylbutanol, pentanol, hexanol, heptanol, and octanol.

The hydroxyl-containing compound useful in the present invention can also be a dihydroxylbenzene, such as

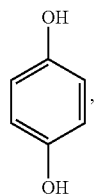

or a hydroxyl-containing compound bearing a photosensitive group, where said photosensitive group can be an ethylenically unsaturated group. Examples of the hydroxyl-containing compound bearing a photosensitive group include, but are not limited to, vinyl alcohol, allyl alcohol, methallyl alcohol, n-butenyl alcohol, isobutenyl alcohol, vinyl phenol, allyl phenol, allyloxymethyl alcohol, allyloxyethyl alcohol, allyloxypropyl alcohol, allyloxybutyl alcohol, allyloxypentyl alcohol, allyloxyhexyl alcohol, methallyloxymethyl alcohol, methallyloxyethyl alcohol, methallyloxypropyl alcohol, methallyloxybutyl alcohol, methallyloxypentyl alcohol, methallyloxyhexyl alcohol, a compound of the following formula (6) and a compound of the following formula (10):

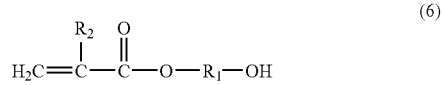

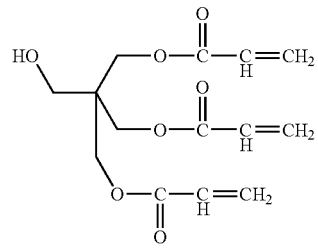

wherein $R_1$ is phenylene, a linear or branched $C_1$-$C_8$ alkylene, a linear or branched $C_2$-$C_8$ alkenylene, a $C_3$-$C_8$ cycloalkylene, or a linear or branched $C_1$-$C_8$ hydroxyalkylene; and $R_2$ is H or a $C_1$-$C_4$ alkyl. Preferably, the compound of formula (6) is selected from the group consisting of 2-hydroxyethyl acrylate (HEA), 2-hydroxyethyl methacrylate (HEMA), 2-hydroxypropyl acrylate, 2-hydroxypropyl methacrylate, and a mixture thereof. Preferably, the compound of formula (6) is 2-hydroxyethyl acrylate (HEA), 2-hydroxyethyl methacrylate (HEMA), or a mixture thereof.

In general, when the compound of formula (2) of the precursor composition for polyimides according to the present invention bears a photosensitive group, the precursor composition can be suitable for lithographic processes, as the precursor composition bears a photosensitive group by itself and can function both as a photoresist and an insulator. In comparison with the compositions without bearing photosensitive groups, the processes using the compositions of the present invention do not require applying a photoresist layer and can have less processing steps. Moreover, since there is no need to additionally remove a photoresist layer, which may result in circuit change, the production yield can be enhanced. To fulfill the desired needs, the invention can select suitable compounds to synthesize the components (a) and (b) for the inventive composition.

In above-mentioned Scheme 3, the dianhydride of formula (5) is normally an aromatic dianhydride, which can be any of the dianhydrides of formula (4) described hereinbefore. In one embodiment, the dianhydride of formula (5) is pyromellitic dianhydride.

The inventors of the present invention discovered that in conventional processes for synthesizing polyimides, it was necessary to first synthesize a poly(amic acid) having a higher molecular weight as a precursor composition, which was then dissolved in a solvent for thermal degradation so as to control the desired molecular weight by adjusting the viscosity. However, such processes normally obtained a precursor composition having a higher water content and such precursor composition must be stored at a low temperature (for example, −20° C.) so as to slow down further degradation and avoid excessively low molecular weight. The present invention can effectively control the molecular weight without utilizing degradation. The precursor compositions of the present invention are more stable and can be stored at room temperature for further uses.

The present invention also provides a polyimide by a low-temperature cyclization, where the polyimide is prepared by polymerizing a precursor composition comprising the following components:

(a) an amic acid oligomer of the following formula (1):

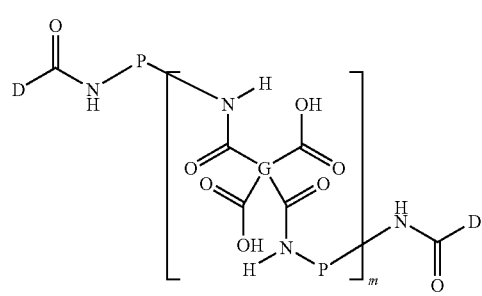

and (b) a compound of the following formula (2)

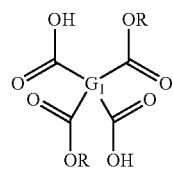

wherein:

R, G, $G_1$, P, D, and m are as defined hereinbefore, and the molar ratio of component (a) to component (b) ranges from 0.8:1 to 1.2:1, preferably from 0.9:1 to 1.1:1.

The present invention further provides a method for preparing a polyimide comprising chemical imidization of the above-mentioned precursor composition.

In the case that acetic anhydride was used as a dehydrating agent, the mechanism of the above-mentioned chemical imidization is as follows:

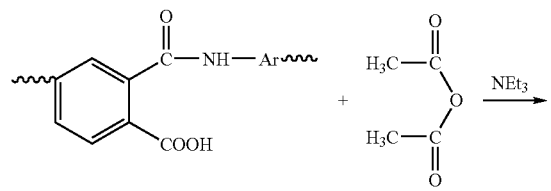

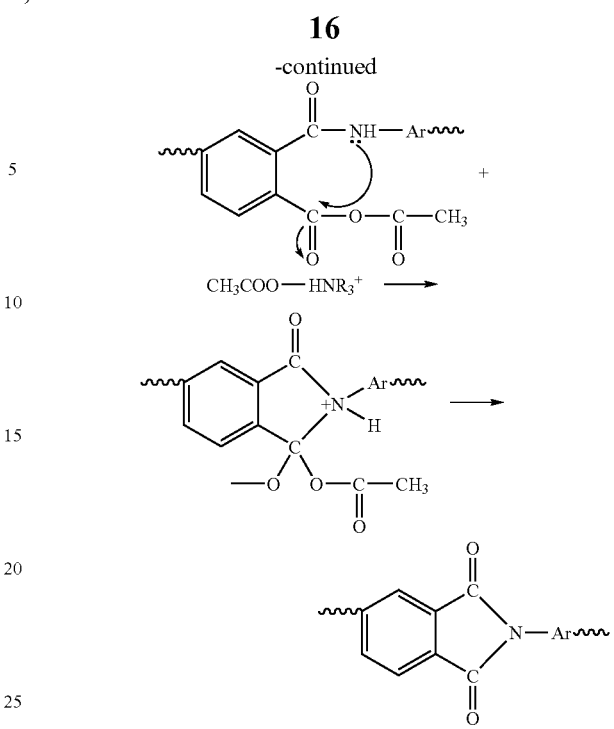

By "chemical imidization," it means that the amic acid oligomer of formula (1) is imidized by reacting with a dehydrating agent to produce the leaving group, CH₃COO—. The dehydrating agent suitable for the present invention is not particularly limited, which can be an anhydride, preferably acetic anhydride. Moreover, to speed up the reaction, a catalyst, such as triethylamine or pyridine, can be added. Chemical imidization is advantageous as it can be conducted at a lower temperature (at about 200° C. or below). In conventional high temperature imidizations, when the products have side chains that possess low bonding energy, the high temperature will break the side chains before the cyclization is conducted, or the high temperature will result in an excessive crosslinking among the side chains during the cyclization, which cause the products difficult to be dissolved and operated. According to the present invention, the imidization can be conducted at a low temperature of no more than 150° C., which can obviate the above-mentioned drawbacks encountered in conventional imidizations and save energy.

For example, the polyimide according to the present invention can be prepared by the following reaction scheme: (a) subjecting an amic acid oligomer (such as

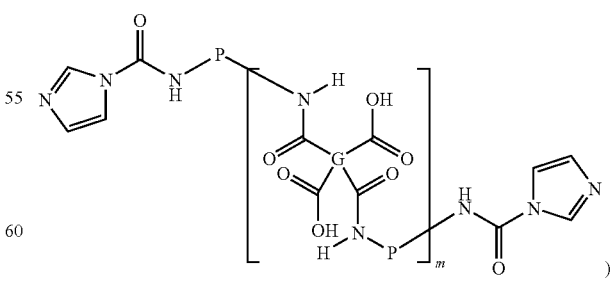

to a condensation, dehydration, and cyclization reaction in the presence of a dehydrating agent (such as acetic anhydride) and catalyst (such as pyridine) by a chemical imidization method to form a compound of formula (11):

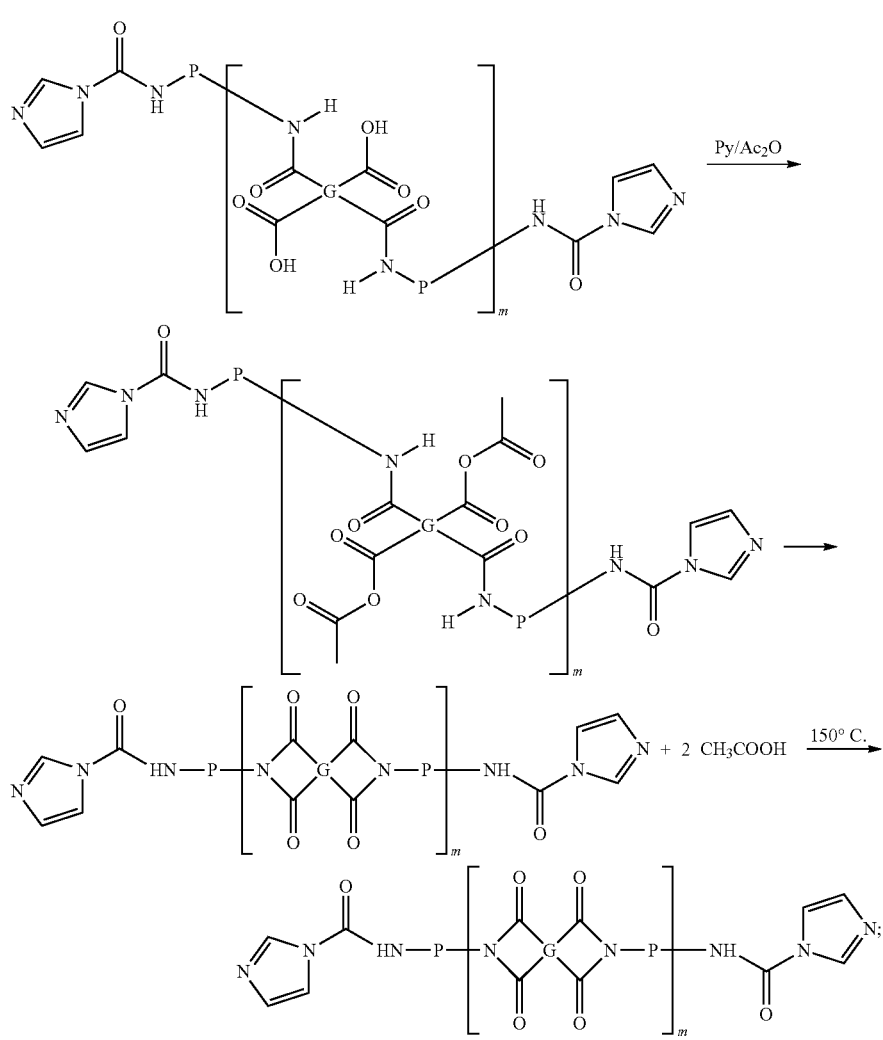
(b) hydrolyzing the compound of formula (11) to form an imide oligomer of formula (12):
(c) adding a compound of formula (2) to the imide oligomer of formula (12) obtained in step (b) to form a dianhydride of formula (5):
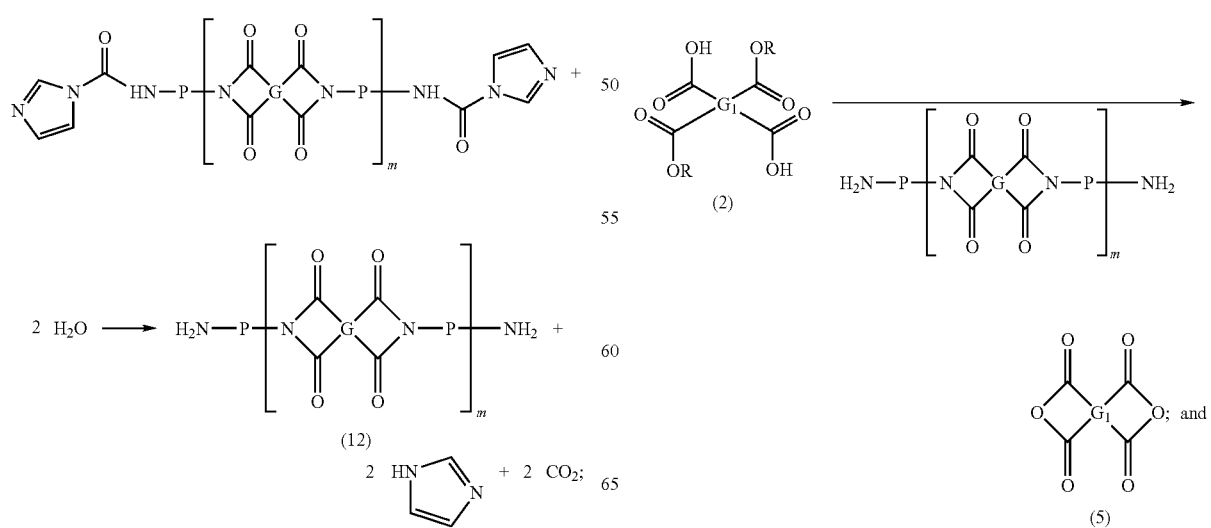

(d) subjecting the dianhydride of formula (5) and the imide oligomer of formula (12) to a condensation reaction and intramolecular cyclization, and afterward intermolecular polymerization and cyclization to form a polyimide:

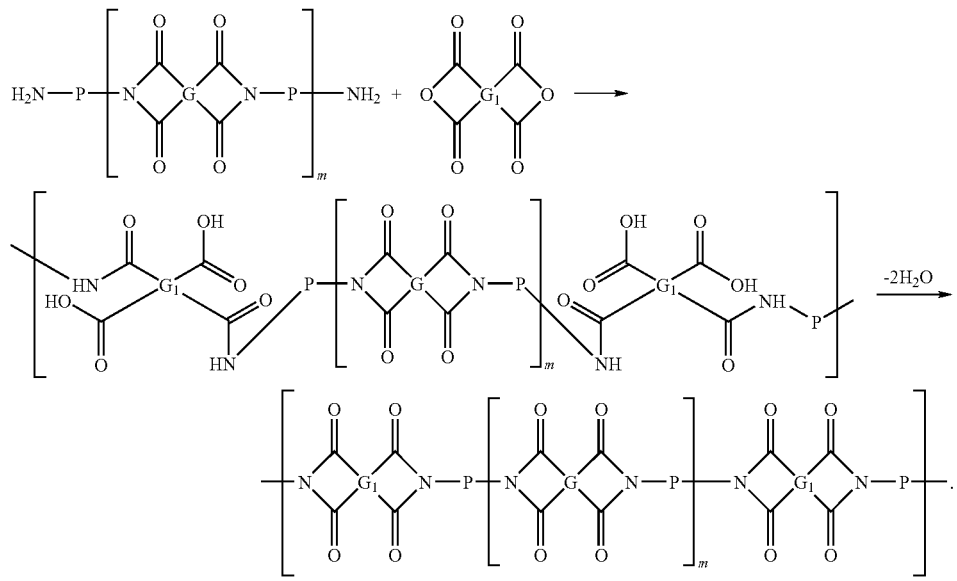

In conventional processes for synthesizing polyimides, it was necessary to first synthesize a poly(amic acid) having a higher molecular weight as a precursor. However, since the higher molecular weight results in an overly high viscosity, the operability of the precursor becomes worse and the leveling properties during coating become poor. Moreover, the overly high molecular weight of poly(amic acid) causes extreme internal stress due to the interaction between the molecules and the shortening of molecular chains during the imidization of the precursor. The extreme internal stress causes warp and deformation of the coated substrate.

Also, in conventional processes for synthesizing polyimides, the solids content of the poly(amic acid) formed via polymerization is between about 10% and about 30%, and thus, the volume shrinkable ratio after cyclization is higher. As a result, the coating procedure must be repeated many times to attain the desired thickness required by a product, which render the process more complicated. Moreover, when conducting dehydration and cyclization at the last stage, conventional precursors for polyimides possess a high viscosity and when the precursor is soft baked, the solvent and water are not easy to be vaporized, and bubbles will occur in the final hard baked film.

On the contrary, the amic acid oligomer according to the present invention possesses a lower molecular weight and has excellent operability and can be coated evenly. In addition, the inventive polyimides are synthesized by polymerizing the amic acid oligomer with the dianhydride derivative of formula (2). Since the amic acid oligomer of formula (1) has terminal protecting groups that can be removed easily, it will not react with the dehydrating agent at room temperature, and thus the chemical imidization method can be conducted at a low temperature and larger polyimide molecules exhibiting excellent thermal, mechanical, and stretching properties can be obtained.

In comparison with conventional techniques, the present invention uses amic acid oligomers with lower viscosities, rather than a polyamic polymer having a higher viscosity, as the precursors. Therefore, the precursors will exhibit better leveling and operative properties when they are being coated. In addition, since the components of the inventive composition have smaller molecules, when conducting imidization reaction, the extreme internal stress caused by the interaction between the polymeric molecules and the shortening of the molecular chains can be avoided. Moreover, according to the present invention, the amic acid oligomer is first subjected to intramolecular cyclization and then intermolecular polymerization and cyclization, which will effectively reduce the remaining internal stress and therefore the warping of the resultant polyimides.

Since the precursor composition for the polyimides of the present invention has a high solids content from 25% to 50%, the amount of the solvent used can be reduced so as to shorten the baking time and lower the baking temperature. Also, the drying and film forming speed is faster and the number of coating times for attaining the desired thickness of the product can be reduced.

Furthermore, in common polymerization reactions, some monomers or short-chain oligomers are typically added so as to result in crosslinking between molecules. According to one embodiment of the present invention in which the compound of formula (2) contained in the precursor composition bears a photo-polymerizable group, since the molecules are small, they can be self-crosslinked during the curing step to form a stable and rigid network structure. Therefore, in comparison with conventional techniques, the precursor composition of the present invention does not require additional unsaturated monomers or oligomers.

The invention will be described in detail by the following examples, and the description is only used to illustrate the present invention, rather than to limit the scope of the present invention. Any modifications or equivalents that can be easily accomplished by persons skilled in the art are within the scope of the disclosure of the present specification and the appended claims.

EXAMPLES

Example 1

2.181 g (0.01 mol) of pyromellitic dianhydride (PMDA) was dissolved in 200 g of N-methyl-2-pyrrolidinone (NMP). The mixture was heated to 50° C. and stirred for 2 hours. 2.322 g (0.02 mol) of 2-hydroxyethyl acrylate (HEA) was dropped into the mixture and stirred for 2 hours at 50° C. Then, 20.024 g (0.1 mol) of 4,4'-oxy-dianiline (ODA) was added to the solution. After complete dissolution, 18.0216 g (0.09 mol) of PMDA was added, and reacted and stirred at 50° C. for six hours. Thereafter, 3.243 g (0.02 mol) of N,N'-carbonyldiimidazole (CDI) was added, and reacted and stirred at 50° C. for one hour. At last, acetic anhydride was added for dehydration.

Comparative Example 1

20.024 g (0.1 mol) of ODA was dissolved in 200 g of NMP, and then the mixture was placed in an ice bath of 0° C. while being stirred for 1 hour. Then, 0.29 g (0.002 mol) of phthalic anhydride was added and the reaction was stirred for 1 hour. Then, 21.59 g (0.099 mol) of PMDA was slowly added and stirred for 12 hours at a constant temperature.

Example 2

2.181 g (0.1 mol) of PMDA was dissolved in 200 g of NMP. The mixture was heated to 50° C. and stirred for 2 hours. 2.60 g (0.02 mol) of 2-hydroxyethyl methacrylate (HEMA) was slowly dropped into the mixture and stirred for 2 hours at 50° C. Then, 20.024 g (0.1 mol) of ODA was added to the solution. After complete dissolution, 18.0216 g (0.09 mol) of PMDA was added, and reacted and stirred at 50° C. for six hours. Thereafter, 3.243 g (0.02 mol) of CDI was added and reacted and stirred at 50° C. for one hour.

Example 3

2.181 g (0.01 mol) of PMDA was dissolved in 200 g of NMP. The mixture was heated to 50° C. and stirred for 2 hours. 2.322 g (0.02 mol) of HEA was slowly dropped into the mixture and stirred for 2 hours at 50° C. Then, 10.814 g (0.1 mol) of para-phenylenediamine (pPDA) was added to the solution. After complete dissolution, 18.0216 g (0.09 mol) of PMDA was added and stirred at 50° C. for six hours. Thereafter, 3.243 g (0.02 mol) of CDI was added and stirred at 50° C. for one hour.

Example 4

2.181 g (0.01 mol) of PMDA was dissolved in 200 g of NMP. The mixture was heated to 50° C. and stirred for 2 hours. 2.60 g (0.02 mol) of HEMA was slowly dropped into the mixture and stirred for 2 hours at 50° C. Then, 10.814 g (0.1 mol) of pPDA was added to the solution. After complete dissolution, 18.0216 g (0.09 mol) of PMDA was added and stirred at 50° C. for six hours. Thereafter, 3.243 g (0.02 mol) of CDI was added and stirred at 50° C. for one hour.

Example 5

2.181 g (0.01 mol) of PMDA was dissolved in 200 g of NMP. The mixture was heated to 50° C. and stirred for 2 hours. 2.322 g (0.02 mol) of HEA was slowly dropped into the mixture and stirred for 2 hours at 50° C. Then, 21.23 g (0.1 mol) of 2,2-dimethyl-4,4-diamino-biphenyl (DMDB) was added to the solution. After complete dissolution, 18.0216 g (0.09 mol) of PMDA was added and stirred at 50° C. for six hours. Thereafter, 3.243 g (0.02 mol) of CDI was added and stirred at 50° C. for one hour.

Example 6

2.181 g (0.01 mol) of PMDA was dissolved in 200 g of NMP. The mixture was heated to 50° C. and stirred for 2 hours. 2.60 g (0.02 mol) of HEMA was slowly dropped into the mixture and stirred for 2 hours at 50° C. Then, 21.23 g (0.1 mol) of DMDB was added to the solution. After complete dissolution, 18.0216 g (0.09 mol) of PMDA was added and stirred at 50° C. for six hours. Thereafter, 3.243 g (0.02 mol) of CDI was added and stirred at 50° C. for one hour.

Example 7

2.181 g (0.01 mol) of PMDA was dissolved in 200 g of NMP. The mixture was heated to 50° C. and stirred for 2 hours. 2.322 g (0.02 mol) of HEA was slowly dropped into the mixture and stirred for 2 hours at 50° C. Then, 21.23 g (0.1 mol) of o-tolidine (oTLD) was added to the solution. After complete dissolution, 18.0216 g (0.09 mol) of PMDA was added and stirred at 50° C. for six hours. Thereafter, 3.243 g (0.02 mol) of CDI was added and stirred at 50° C. for one hour.

Example 8

2.181 g (0.01 mol) of PMDA was dissolved in 200 g of NMP. The mixture was heated to 50° C. and stirred for 2 hours. 2.602 g (0.02 mol) of HEMA was slowly dropped into the mixture and stirred for 2 hours at 50° C. Then, 21.23 g (0.1 mol) of oTLD was added to the solution. After complete dissolution, 18.0216 g (0.09 mol) of PMDA was added and stirred at 50° C. for six hours. Thereafter, 3.243 g (0.02 mol) of CDI was added and stirred at 50° C. for one hour.

Example 9

2.181 g (0.01 mol) of PMDA was dissolved in 200 g of NMP. The mixture was heated to 50° C. and stirred for 2 hours. 2.322 g (0.02 mol) of HEA was slowly dropped into the mixture and stirred for 2 hours at 50° C. Then, 32.024 g (0.1 mol) of 2,2'-bis(trifluoromethyl)benzidine (TFMB) was added to the solution. After complete dissolution, 18.0216 g (0.09 mol) of PMDA was added and stirred at 50° C. for six hours. Thereafter, 3.243 g (0.02 mol) of CDI was added and stirred at 50° C. for one hour.

Example 10

2.181 g (0.01 mol) of PMDA was dissolved in 200 g of NMP. The mixture was heated to 50° C. and stirred for 2 hours. 2.60 g (0.02 mol) of HEMA was slowly dropped into the mixture and stirred for 2 hours at 50° C. Then, 32.024 g (0.1 mol) of TFMB was added to the solution. After complete dissolution, 18.0216 g (0.09 mol) of PMDA was added and stirred at 50° C. for six hours. Thereafter, 3.243 g (0.02 mol) of CDI was added and stirred at 50° C. for one hour.

Example 11

2.181 g (0.01 mol) of PMDA was dissolved in 200 g of NMP. The mixture was heated to 50° C. and stirred for 2 hours. 2.322 g (0.02 mol) of HEA was slowly dropped into the mixture and stirred for 2 hours at 50° C. Then, 20.024 g (0.1 mol) of ODA was added to the solution. After complete dissolution, 18.0216 g (0.09 mol) of PMDA was added and stirred at 50° C. for six hours. Thereafter, 4.365 g (0.02 mol) of di-tert-butyl dicarbonate ($Boc_2O$) was added and stirred at 50° C. for five hours.

Example 12

2.181 g (0.01 mol) of PMDA was dissolved in 200 g of NMP. The mixture was heated to 50° C. and stirred for 2 hours. 2.60 g (0.02 mol) of HEMA was slowly dropped into the mixture and stirred for 2 hours at 50° C. Then, 20.024 g (0.1 mol) of ODA was added to the solution. After complete dissolution, 18.0216 g (0.09 mol) of PMDA was added and stirred at 50° C. for six hours. Thereafter, 4.365 g (0.02 mol) of $Boc_2O$ was added and stirred at 50° C. for five hours.

Example 13

2.181 g (0.01 mol) of PMDA was dissolved in 200 g of NMP. The mixture was heated to 50° C. and stirred for 2 hours. 2.322 g (0.02 mol) of HEA was slowly dropped into the mixture and stirred for 2 hours at 50° C. Then, 10.814 g (0.1 mol) of pPDA was added to the solution. After complete dissolution, 18.0216 g (0.09 mol) of PMDA was added and stirred at 50° C. for six hours. Thereafter, 4.365 g (0.02 mol) of $Boc_2O$ was added and stirred at 50° C. for five hours.

Example 14

2.181 g (0.01 mol) of PMDA was dissolved in 200 g of NMP. The mixture was heated to 50° C. and stirred for 2 hours. 2.60 g (0.02 mol) of HEMA was slowly dropped into the mixture and stirred for 2 hours at 50° C. Then, 10.814 g (0.1 mol) of pPDA was added to the solution. After complete dissolution, 18.0216 g (0.09 mol) of PMDA was added and stirred at 50° C. for six hours. Thereafter, 4.365 g (0.02 mol) of $Boc_2O$ was added and stirred at 50° C. for five hours.

Example 15

2.181 g (0.01 mol) of PMDA was dissolved in 200 g of NMP. The mixture was heated to 50° C. and stirred for 2 hours. 2.322 g (0.02 mol) of HEA was slowly dropped into the mixture and stirred for 2 hours at 50° C. Then, 21.23 g (0.1 mol) of DMDB was added to the solution. After complete dissolution, 18.0216 g (0.09 mol) of PMDA was added and stirred at 50° C. for six hours. Thereafter, 4.365 g (0.02 mol) of $Boc_2O$ was added and stirred at 50° C. for five hours.

Example 16

2.181 g (0.01 mol) of PMDA was dissolved in 200 g of NMP. The mixture was heated to 50° C. and stirred for 2 hours. 2.60 g (0.02 mol) of HEMA was slowly dropped into the mixture and stirred for 2 hours at 50° C. Then, 21.23 g (0.1 mol) of DMDB was added to the solution. After complete dissolution, 18.0216 g (0.09 mol) of PMDA was added and stirred at 50° C. for six hours. Thereafter, 4.365 g (0.02 mol) of $Boc_2O$ was added and stirred at 50° C. for five hours.

Example 17

2.181 g (0.01 mol) of PMDA was dissolved in 200 g of NMP. The mixture was heated to 50° C. and stirred for 2 hours. 2.322 g (0.02 mol) of HEA was slowly dropped into the mixture and stirred for 2 hours at 50° C. Then, 21.23 g (0.1 mol) of oTLD was added to the solution. After complete dissolution, 18.0216 g (0.09 mol) of PMDA was added and stirred at 50° C. for six hours. Thereafter, 4.365 g (0.02 mol) of $Boc_2O$ was added and stirred at 50° C. for five hours.

Example 18

2.181 g (0.01 mol) of PMDA was dissolved in 200 g of NMP. The mixture was heated to 50° C. and stirred for 2 hours. 2.602 g (0.02 mol) of HEMA was slowly dropped into the mixture and stirred for 2 hours at 50° C. Then, 21.23 g (0.1 mol) of oTLD was added to the solution. After complete dissolution, 18.0216 g (0.09 mol) of PMDA was added and stirred at 50° C. for six hours. Thereafter, 4.365 g (0.02 mol) of $Boc_2O$ was added and stirred at 50° C. for five hours.

Example 19

2.181 g (0.01 mol) of PMDA was dissolved in 200 g of NMP. The mixture was heated to 50° C. and stirred for 2 hours. 2.322 g (0.02 mol) of HEA was slowly dropped into the mixture and stirred for 2 hours at 50° C. Then, 32.024 g (0.1 mol) of TFMB was added to the solution. After complete dissolution, 18.0216 g (0.09 mol) of PMDA was added and stirred at 50° C. for six hours. Thereafter, 4.365 g (0.02 mol) of $Boc_2O$ was added and stirred at 50° C. for five hours.

Example 20

2.181 g (0.01 mol) of PMDA was dissolved in 200 g of NMP. The mixture was heated to 50° C. and stirred for 2 hours. 2.60 g (0.02 mol) of HEMA was slowly dropped into the mixture and stirred for 2 hours at 50° C. Then, 32.024 g (0.1 mol) of TFMB was added to the solution. After complete dissolution, 18.0216 g (0.09 mol) of PMDA was added and stirred at 50° C. for six hours. Thereafter, 4.365 g (0.02 mol) of $Boc_2O$ was added and stirred at 50° C. for five hours.

Test on Polyimide for Physical Properties

The relevant data regarding the molecular weights of polyimides produced in the examples and comparative example were measured by a HT-GPC instrument (Waters Model: 2010) and listed in Table 1.

TABLE 1

| Sample | $M_n$ | $M_w$ | MP[1] | PD[2] |
|---|---|---|---|---|
| Present invention (Example 1) | 29,846 | 55,182 | 38,041 | 1.848880 |
| Present invention (Example 11) | 24,305 | 40,994 | 36,116 | 1.68664 |
| Prior art (Comparative Example 1) | 106,828 | 263,324 | 266,462 | 2.464926 |

[1]peak value of molecular weight
[2]polydispersity

It can be see from the data in Table 1 that the present invention can provide a polyimide with a lower polydispersity, i.e., with a narrower molecular weight distribution and a smaller difference between a high and low molecular weights, showing a better quality.

The compositions of Examples 1 and 11 and Comparative Example 1 were formed into films by spin coating. Then, the films were baked in an oven with a three-stage heating curve control, i.e., 150° C./60 min, 250° C./60 min, and 350° C./120 min at a heating rate of 2° C./min, and then cooled. The films were tested for their physical properties.

The mechanical properties of the polyimide films were tested by a universal testing machine (High Temperature Bending Tester, Model 9102, produced by Hungta Instrument). The polyimide films were cut into test samples with a dimension of 12 cm×10 cm×0.25 mm and then installed on the universal testing machine. The test was conducted at a temperature of 23° C. and at a rate of 10 mm/min. The polyimide films prepared from the compositions of Examples 1 and 11 and Comparative Example 1 were separately tested to measure their tensile strengths. The results were listed in Table 2.

TABLE 2

| Sample | Tensile strength (MPa) | Elongation percent (%) |
|---|---|---|
| Present invention (Example 1) | 137 | 41.7% |
| Present invention (Example 11) | 145 | 66% |
| Prior art (Comparative Example 1) | 127 | 23.4% |

The results in Table 2 show that the polyimide films of the present invention exhibit a better tensile strength and elongation.

What is claimed is:

1. A precursor composition for a polyimide, comprising (a) an amic acid oligomer of formula (1):

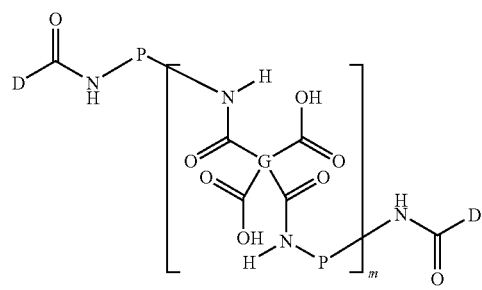

and
(b) a compound of formula (2):

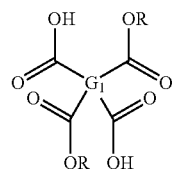

wherein
R represents a linear or branched alkyl with 1 to 14 carbon atoms, a phenol group, or an ethylenically unsaturated group;
G and $G_1$ can be the same or different and each independently represent a tetravalent organic group;
P represents a divalent organic group;

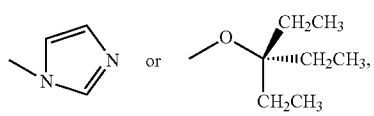

D each independently represents and
m is an integer from 1 to 100.

2. The precursor composition of claim 1, wherein component (a) and component (b) are present in a molar ratio ranging from 0.8:1 to 1.2:1.

3. The precursor composition of claim 1, wherein component (a) and component (b) are present in a molar ratio ranging from 0.9:1 to 1.1:1.

4. The precursor composition of claim 1, wherein the ethylenically unsaturated group is selected from the group consisting of vinyl, propenyl, methylpropenyl, n-butenyl, isobutenyl, vinylphenyl, propenylphenyl, propenyloxymethyl, propenyloxyethyl, propenyloxypropyl, propenyloxybutyl, propenyloxyamyl, propenyloxyhexyl, methylpropenyloxymethyl, methylpropenyloxyethyl, methylpropenyloxypropyl, methylpropenyloxybutyl, methylpropenyloxyamyl, and methylpropenyloxyhexyl, a group of the following formula (7), and a group of the following formula (3):

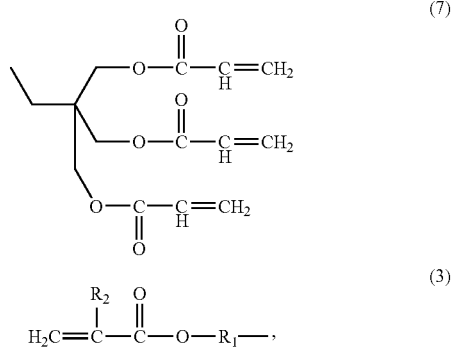

wherein, $R_1$ is phenylene, a linear or branched $C_1$-$C_8$ alkylene, a linear or branched $C_2$-$C_8$ alkenylene, a $C_3$-$C_8$ cycloalkylene, or a linear or branched $C_1$-$C_8$ hydroxyalkylene, and $R_2$ is H or a $C_1$-$C_4$ alkyl.

5. The precursor composition of claim 1, wherein R each independently represents:

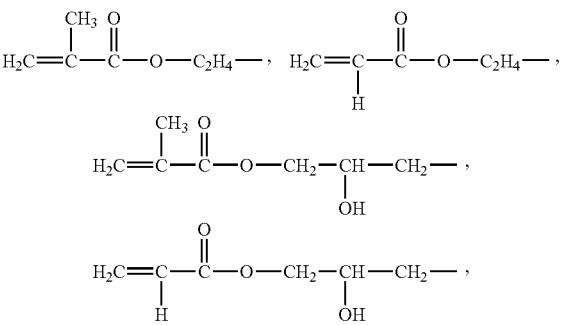

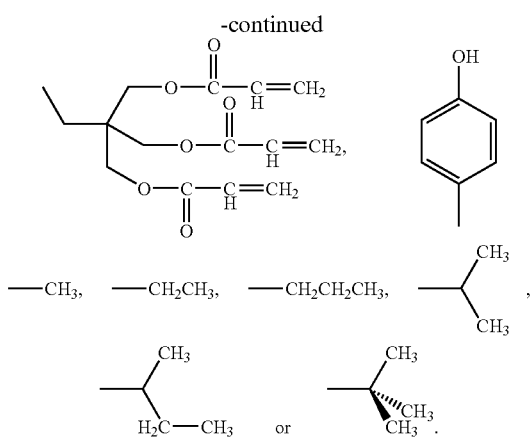

6. The precursor composition of claim 1, wherein the tetravalent organic group is selected from the group consisting of:

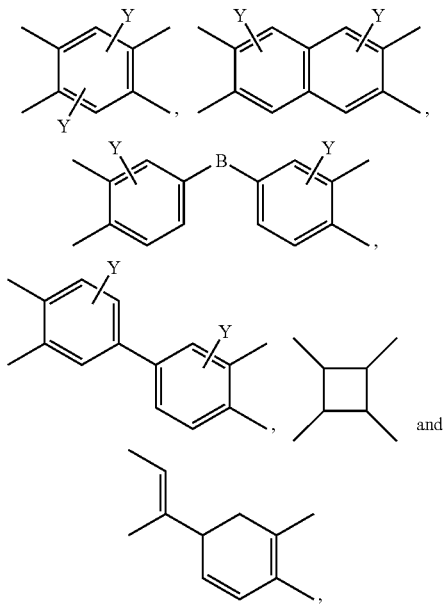

wherein Y each independently represents H, a halo group, $C_1$-$C_4$ alkyl, or $C_1$-$C_4$ perfluoroalkyl, and B represents —$CH_2$—, —O—, —S—, —CO—, —$SO_2$—, —$C(CH_3)_2$—, or —$C(CF_3)_2$—.

7. The precursor composition of claim 6, wherein the tetravalent organic group is selected from the group consisting of:

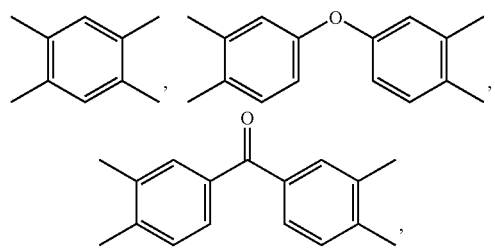

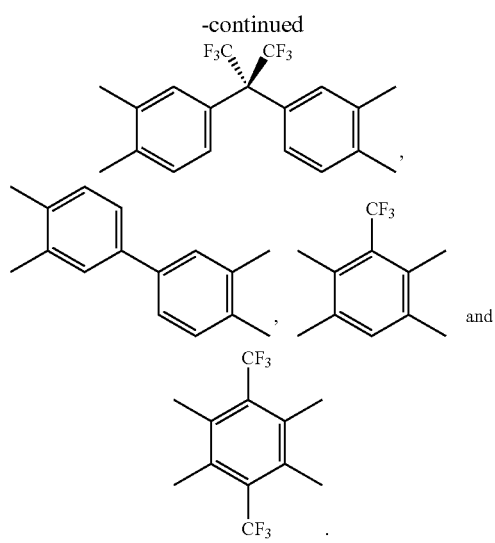

8. The precursor composition of claim 1, wherein the divalent organic group is selected from the group consisting of:

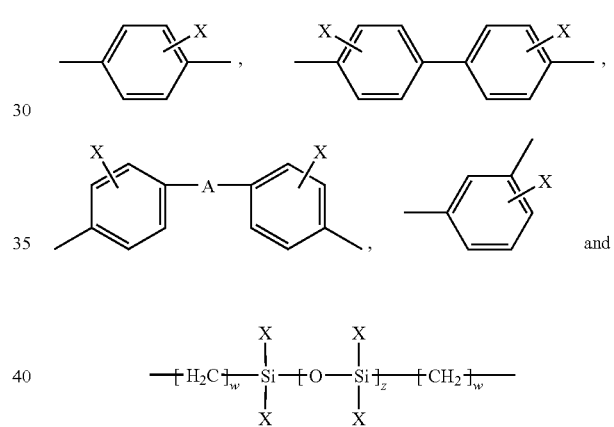

wherein X each independently represents H, a halo group, $C_1$-$C_4$ alkyl, or $C_1$-$C_4$ perfluoroalkyl; A represents —O—, —S—, —CO—, —$CH_2$—, —OC(O)—, or —CONH—; and w and z each represent an integer from 1 to 3.

9. The precursor composition of claim 8, wherein the divalent organic group is selected from the group consisting of:

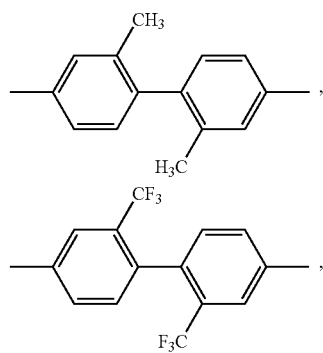

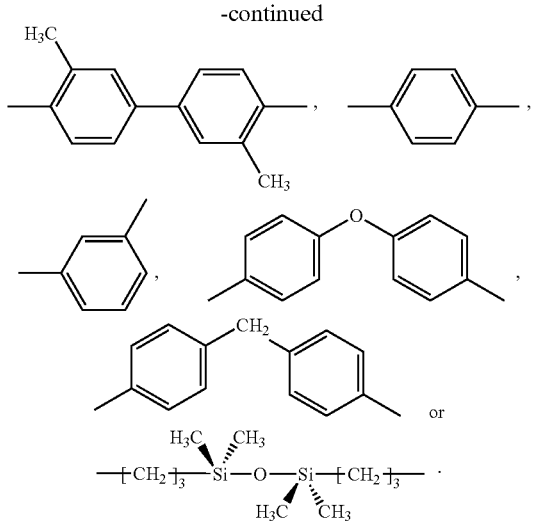

10. The precursor composition of claim 1, wherein m is an integer from 5 to 50.

11. The precursor composition of claim 1, further comprising a polar aprotic solvent selected from the group consisting of N-methylpyrrolidone, N,N-dimethylacetamide, N,N-dimethylformamide, dimethyl sulfoxide, and a mixture thereof.

12. The precursor composition of claim 1, further comprising a photoinitiator selected from the group consisting of benzophenone, benzoin, 2-hydroxy-2-methyl-1-phenyl-propan-1-one, 2,2-dimethoxy-1,2-diphenylethan-1-one, 1-hydroxy cyclohexyl phenyl ketone, 2,4,6-trimethylbenzoyl diphenyl phosphine oxide, and a mixture thereof.

13. The precursor composition of claim 1, further comprising a coupling agent selected from the group consisting of 3-aminopropyltrimethoxysilane (APrTMOS), 3-triaminopropyltriethoxysilane (APrTEOS), 3-aminophenyltrimethoxysilane (APTMOS), 3-aminophenyltriethoxysilane (APTEOS), and a mixture thereof.

* * * * *